Feb. 24, 1931.   H. FORD   1,793,920
BRAKE
Filed June 13, 1927   2 Sheets-Sheet 2

INVENTOR.
Henry Ford.
BY
ATTORNEY.

Patented Feb. 24, 1931

1,793,920

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

BRAKE

Application filed June 13, 1927. Serial No. 198,516.

The object of my invention is to provide a brake of simple durable and inexpensive construction.

A further object of my invention is to provide a brake adjusting mechanism wherein practically none of the brake forces are applied to the adjusting mechanism in such a way as to affect or wear said adjusting mechanism.

Still a further object of my invention is to provide a brake in which the ends of the brake shoe may be adjusted toward and from each other without, however, interfering with the free movement of said brake shoes, caused by the rotation of the drum to which they may be applied.

Still a further object of my invention is to provide an adjusting mechanism for a brake having floating shoes wherein an expansible pivotal connection is provided between the adjacent ends of two shoes and means for expanding this connection are provided without interfering with the floating of said brake shoes.

Still a further object of my invention is to provide in combination with the means just mentioned, means for yieldingly centering the brake shoes within the drum when the brake shoes are in inoperative position.

Still a further object of my invention is to provide a connection between two floating brake shoes wherein a turn-buckle construction is used and the threaded ends of the turn-buckle are pivotally mounted in the brake shoes while the turnbuckle proper may be operated to spread said shoes without interfering with the free floating thereof.

Still a further object of my invention is to provide a floating self-energizing brake of the two-shoe type which will be self energizing in each direction and which may be adjusted as much as may be necessary and wherein the brake shoes will be yieldingly urged to a central position when they are not in use.

Still a further object of my invention is to provide a brake mechanism which may be operated by a brake actuating rod extended through a king bolt and in which the operating mechanism will not interfere with the free floating of the brake shoes.

Still a further object of my invention is to provide a combination stop and operating mechanism for floating brake shoes which is sturdy, cheap, and compact.

With these and other objects in view my invention consists in the arrangement combination and construction of the various parts of my improved device as described in the specifications, claimed in the claims, and illlustrated in the accompanying drawings, in which—

Figure 4 shows a horizontal sectional view taken on the line 4—4 of Figure 2 and Figure 5 shows a horizontal sectional view taken on the line 5—5 of Figure 3.

Figure 1:
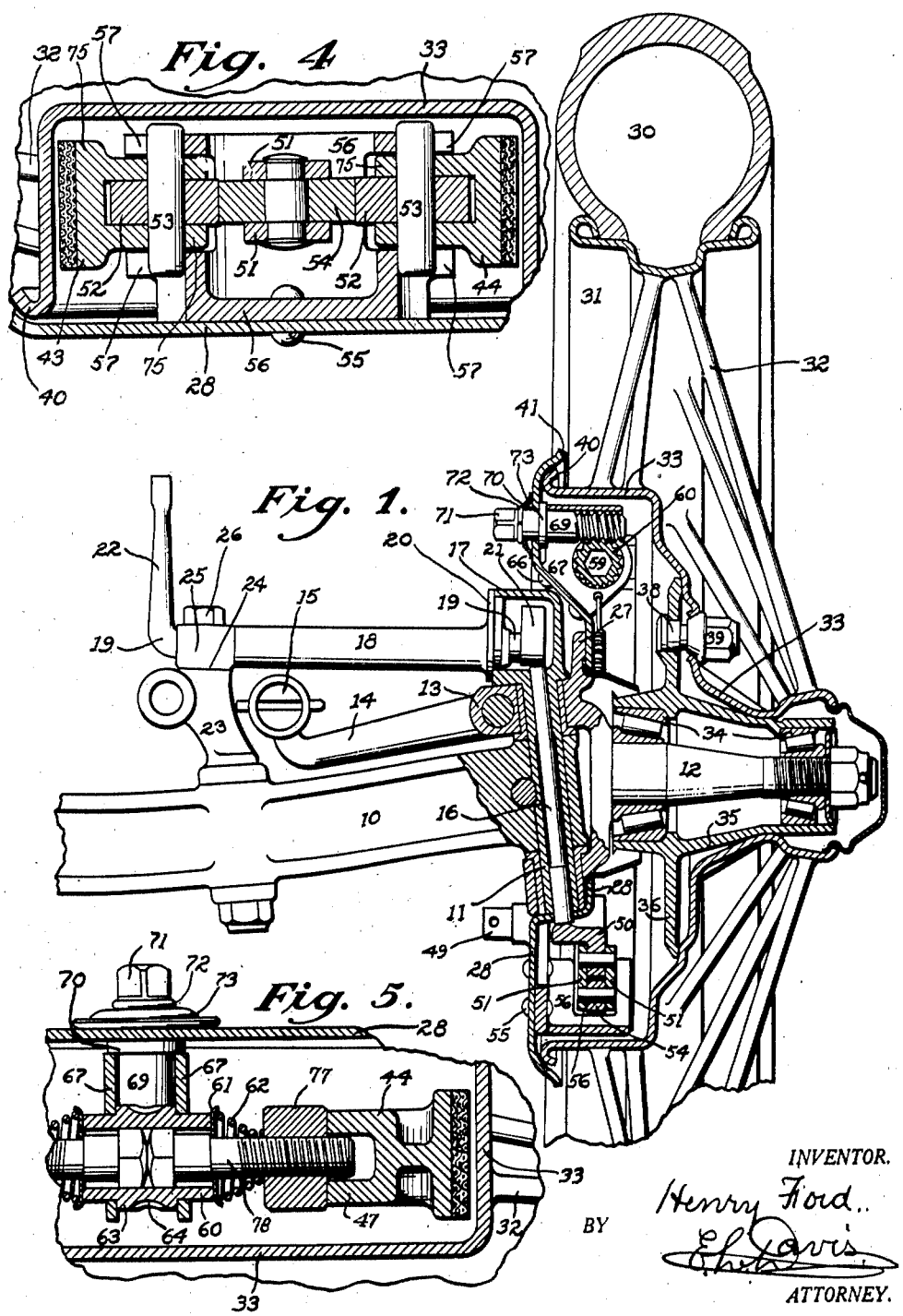
Figure 1 shows a vertical central, sectional view along the axis of the spindle and spindle bolt of my improved brake construction.
Figure 2:
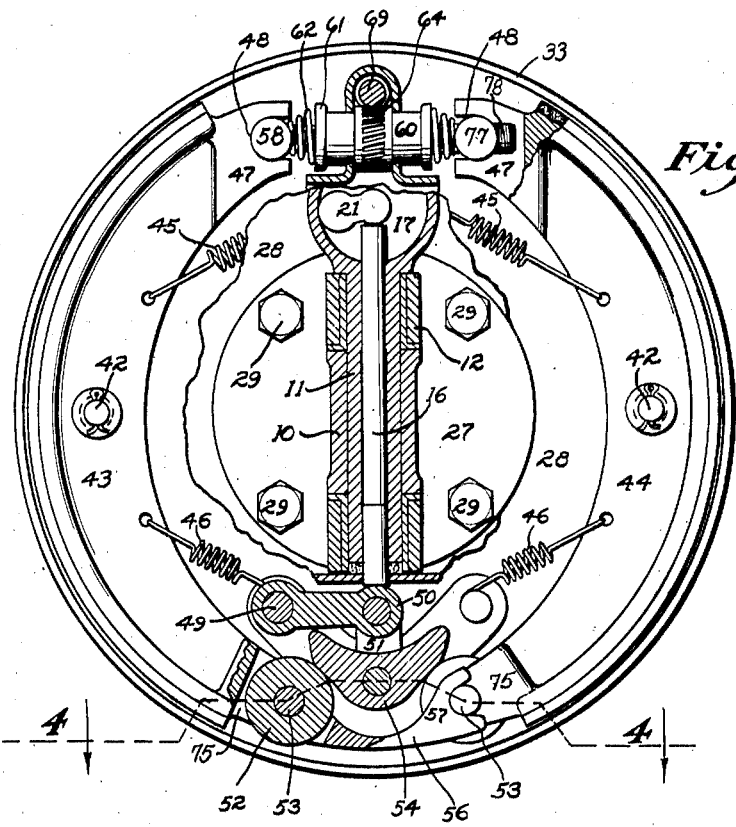
Figure 2 shows a substantially vertical sectional view taken in planes substantially perpendicular to the plane of the section in Figure 1, the section being taken along the axis of the spindle bolt and then swung over the central plane of the brake shoes.
Figure 3:
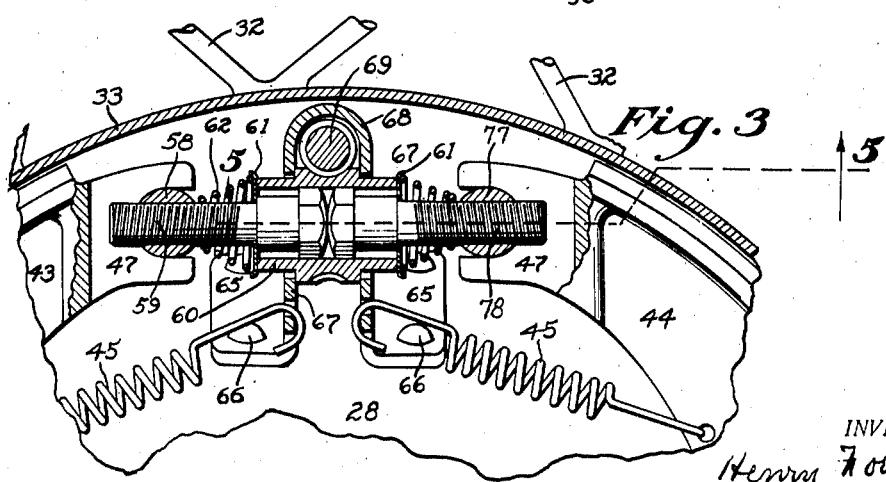
Figure 3 shows an enlarged detailed central vertical sectional view illustrating the adjusting mechanism.

Referring to the accompanying drawings, I have used a reference numeral 10 to indicate generally the front axle of the vehicle having an opening through the end thereof adapted to receive a hollow spindle bolt 11, upon which a spindle 12 is mounted by means of its forked ends. The spindle 12 has an extension 13 designed to receive a steering arm 14 which may be connected to a ball and socket joint 15 which in turn would be connected to a drag link (not here shown). The parts just mentioned, so far as they have been described are of ordinary construction, and further details thereof will not be given except in so much as may be necessary to illustrate my improved brake construction. The spindle bolt 11 is provided with a longitudinal bore, designed to receive a brake actuating rod 16 so that the latter may reciprocate freely therein. The upper end of the spindle bolt 11 is provided with a cup shaped housing 17 which in the form here shown is integral with the spindle bolt proper.

A sleeve 18 forms the bearing for a brake actuating shaft 19 and has an enlarged flange 20 at its outer end designed to coact with the housing 17 to complete the closure thereof. The inner end of the shaft 19 has a cam 21 secured thereto and the outer end has an arm 22 thereon which may, if desired, be formed integral therewith. The arm 22 is arranged so that it may be operated from a foot pedal or a hand lever on a vehicle and thereby rotate shaft 19 to actuate the cam 21 and thereby reciprocate the brake actuating rod 16.

A spring perch 23 is secured to the axle in position spaced from the spindle bolt 11 and has a flattened surface 24 at the upper end thereof to which a boss 25 on the sleeve 18 may be secured as by a screw 26. The spindle 12 is provided with an annular flange 27 to which a brake anchor plate 28 may be secured in any suitable manner as by bolts 29.

The spindle bolt 11 is extended through the end of the axle 10 with its axis inclined from the vertical toward the center of the vehicle so that the point of contact of the tire will substantially coincide with the axis of the spindle bolt. For this reason the upper end of the spindle bolt is further in than the lower end thereof and I have provided the brake anchor plate 28 with a counter sunk or offset portion so that the lower end of the brake actuating rod 16 may extend through the shoulder in the brake anchor plate at the bottom of the counter sunk portion.

A wheel is provided with a tire 30 which is mounted on a rim 31 which in turn is connected by spokes 32 with a combined hub and brake drum member 33. The spindle 12 is provided with spaced roller bearings 34 which have the permanent hub member 35 rotatably mounted thereon. This permanent hub member has an annular flange 36 extending therefrom which has a plurality of openings which are designed to have a plurality of wheel securing bolts 38 fixed therein. The combined brake drum and wheel hub member 33 is provided with openings registering with the bolts 38 so that nuts 39 may be run down on these bolts 38 to lock the wheel to the permanent hub member 35. The member 33 is provided at its outer edge with an annular flange of channel cross section with the trough of the channel turned toward the outer side of the wheel as is illustrated at 40. The periphery of the brake anchor plate 28 is flanged over to form a housing for the flange 40 and a throw off flange 41. It will be seen that this construction protects the brake mechanism housed between the wheel hub and the brake anchor plate from being subjected to water, dirt, or oil under any ordinary conditions.

A pair of studs 42 are fixed in the brake anchor plate 28 and extend outwardly therefrom to form a part of the support for a pair of brake shoes 43 and 44. These brake shoes are yieldingly urged out of engagement with a drum 33 by pairs of springs 45 and 46. These brake shoes are provided at the ends thereof with pairs of spaced ears 47 and 75, the upper pairs 47 having registering notches 48 therein.

A stud 49 is fixed to the brake anchor plate 28 and extends outwardly therefrom to form a pivotal support for an arm 50. A pair of links 51 are pivotally supported at the free end of the arm 50 below the lower end of the actuating rod 16 and approximately in line with the ears at the ends of the brake shoes 43 and 44. Rollers 52 are provided with pins 53 which are secured in the ears 75 at the lower end of the brake shoes 43 and 44 so that these rollers 52 may be pivotally supported at said ends of said brake shoes. A cam member 54 is pivotally mounted intermediate of its ends at the bottom of the links 51 and between these links so that the cam 54 may be aligned with the rollers 52 and operate to separate these rollers or allow them to approach each other. This cam 54 is generally of crescent shape and is provided with working faces at both ends so as to obtain a quick setting of the brake shoes thereby with a relatively strong pressure against the shoes when the shoes are set against the drum whereby the brake may be both quick and positive.

The arm 50 is wide enough at its free end to be engaged by the lower end of the brake actuating rod 16 and still the links 51 may be pivoted thereto in position to carry cam 54 in alignment with the rollers 52.

From the construction of the parts heretofore described it will be seen that the swinging of the arm 22 will actuate the brake actuating rod 16 to press same downwardly. When this rod is pressed downwardly, the cam 54 is correspondingly depressed to thereby separate rollers 52 against the brake drum 33. Any tendency of the shoes 43 and 44 to travel with the drum will be permitted so far as the cam is concerned by the swinging of the links 51. The springs 45 and 46 will retract the brake shoes and their operating mechanism to the normal or neutral position whenever the pressure on the arm 22 is released.

A stop member is riveted as at 55 to the brake anchor plate 28 and provided with a horizontal outwardly extending portion 56 which has at either end spaced pairs of notched ears 57. The pins 53 which carry the rollers 52 are long enough so that they will engage the notches in the ears 57 to prevent movement of the brake shoes 43 and 44 with the drum 33 beyond a predetermined distance. From the foregoing it will be seen that whichever way the drum 43 may be rotating, a pin 53 will engage one pair of ears 57 to thereby form a stop for the brake shoes and still permit these shoes to be of the self energizing type in either direction of rotation of the drum 33.

Rods 58 and 77 are extended across the ears 47 and rest in the notches 48 in the shoes 43 and 44 at the upper end thereof. These rods 58 and 77 are provided with a threaded opening intermediate of their ends designed to receive screws 59 and 78. The openings in the rods 58 and 77 and the threads on the screws 59 and 78 are right and left hand threads with respect to the shoes 43 and 44 so that rotation of the screws 59 and 78 in the same direction will tend to draw the rods 58 and 77 together or separate them. These screws 59 and 78 are connected to rotate together by means of a sleeve 60 which is provided with a hexagonal bore therethrough designed to closely engage hexagonal heads on the screws 59 and 78. A washer 61 is loosely mounted on the screws 59 and 78 at each end of the sleeve 60 and a compressible coil spring 62, bears against the rods 58 and 77 at one end and against washers 61 at the other end to thereby tend to push the ends of the shoes 43 and 44 away from the sleeve 60. Screws 59 and 78 are provided with a shoulder 74 adjacent to their hexagonal heads which lays substantially in the plane of the end of the sleeve 60 when the parts are in their normal or retracted positions.

The washer 61 in the normal position of the parts bears against the end of the sleeve 60 and shoulder 74. If, however, the brake shoes are moved to position where they will not be centered with the brake anchor plate, then one of springs 62 will be compressed between the rod 58 or 77 and the adjacent end of the sleeve 60. The other spring, however, will not tend to affect the position of the parts as it will be held out of action by the movement of the adjacent screw 59 or 78 out of the sleeve 60 which will carry the adjacent washer 61 along with the screw due to the shoulder 74. In other words there will always be available the full pressure of one of the springs 62 to return the brake shoes to their central position. This construction is highly important, as it is necessary that the shoes should be centralized in their retracted positions to prevent dragging of the shoes on the drum. It will be seen that the pairs of springs 45 and 46 will not accomplish the same purpose as springs 62 because they always act against each other, and consequently poise the shoes in a central position instead of positively holding them in that position. It will be seen that this sleeve 60 and screws 59 and 78 together form a turnbuckle unit whereby the distance between the ends of the shoes 43 and 44 may be adjusted but the floating of both these shoes will not be limited by these adjustments as the screws 59 and 78 may slide as much as may be necessary through the sleeve 60.

This sleeve 60 is provided with an annular exterior rib 63 intermediate of its ends and this rib is notched at 64 to form worm teeth. A bracket is designed to rotatably mount this sleeve 60 on the brake anchor plate 28 and comprises an integral sheet metal member having flanges 65 which are riveted at 66 to the brake anchor plate 28. Parallel walls 67 extend upwardly from this flange 65 and are provided with registering openings designed to receive the ends of the sleeve 60 so that this sleeve may be held from longitudinal movement out of the bracket member by the engagement of the rib 63 with the walls 67. The upper ends of the walls 67 are connected by an arched portion 68, which forms a bearing for a worm shaft 69. This shaft is provided with an annular flange 70 which bears against the brake anchor plate 28 so that the outer end of the shaft 69 may be squared as at 71. Adjacent to the squared portion of the shaft 69 a groove is provided therein designed to receive a split resilient ring 72 which engages a washer 73 whereby the shaft 69 may be held through longitudinal movement from the brake anchor plate 28.

From the foregoing it will be seen that rotation of the shaft 69 will rotate the sleeve 60 from the worm connection therebetween, thereby spreading or drawing together the upper ends of the shoes 43 and 44 to adjust the position of the shoes in the drum.

Many advantages result from the use of my improved brake structure, and it should be specially pointed out that with the adjustments described the strain of the brake action is not transmitted to any appreciable extent to the adjusting mechanism of the brake shoes so that there is practically no chance that the brake strains will affect the brake adjustment.

Still a further advantage results from the fact that this adjustment of the shoes does not interfere with the full floating action of the brake shoes so that the brake may be self energizing in either direction.

Other advantages result from the use of my improved cam operating mechanism in that this also permits floating of the shoes in either direction to make them self energizing in both directions and because the parts are so constructed that there is little danger of their getting out of order. Some changes may be made in the arrangement, construction, and combination of the various parts of my improved device without departing from the spirit of my claims and it is my intention to cover by the claims such changes as may reasonably be included in the scope thereof.

I claim as my invention:

1. In a brake construction, a brake anchor plate, a worm shaft journalled therein and extended therefrom, a hollow sleeve having exterior threads thereon, means for journalling said sleeve on said anchor plate in a position so that the threads may coact with the threads of the worm shaft, a pair of shoes mounted on said anchor plate, and a threaded member having one end mounted in said sleeve and the other end pivoted to a shoe whereby rotation of the worm shaft may rotate the sleeve and the threaded member to thereby adjust the position of said shoe relative to the anchor plate.

2. In a brake construction, a brake anchor plate, a pair of brake shoes floated on said anchor plate, a turnbuckle construction having its ends pivotally mounted in the adjacent ends of said shoes, whereby the position of said shoes may be adjusted relative to the brake anchor plate, opposed springs adapted to yieldingly urge the brake shoes into a central position, and an additional pair of springs associated with said turnbuckle construction, said springs being mounted so that when the brake shoes are out of central position, then one spring will positively urge them into said position and the other spring will be inoperative.

3. In a brake construction, a brake anchor plate, a pair of brake shoes floated on said anchor plate, opposed springs mounted to urge the shoes into a central position relative to the anchor plate, and a pair of auxiliary springs mounted so that when the brake shoes are not in central position relative to the anchor plate, then one of the auxiliary springs will urge said shoes to a central position, and the other spring will be inoperative.

4. In a brake, an anchor plate, a pair of floating brake shoes mounted on said anchor plate, adjusting members pivotally connected to the adjacent ends of said shoes, and operating means mounted on said anchor plate in which the adjusting members are floatingly mounted, said operating means extending through the anchor plate so as to be accessible from the exterior thereof.

5. In a brake, an anchor plate, a pair of floating brake shoes mounted on said anchor plate, adjusting members pivotally connected to the adjacent ends of said brake shoes, hexagonal heads provided on each adjusting member, and operating means mounted on said anchor plate in which said heads are reciprocally mounted, said operating means extending through the anchor plate so as to be accessible from the exterior thereof.

6. In a brake, a brake anchor plate, a pair of brake shoes floatingly mounted on said anchor plate, and a pair of springs disposed between said shoe ends and anchor plate so that during a circumferential movement of the shoes from their normal centered position, one of said springs will be compressed while the other spring will be prevented from expansion so that the full pressure of said compressed spring will urge the brake shoes to their centered positions.

HENRY FORD.